United States Patent
Mitchell, Jr. et al.

(10) Patent No.: US 7,734,249 B1
(45) Date of Patent: Jun. 8, 2010

(54) METHOD AND SYSTEM FOR REPORTING USAGE OF A REPEATER IN WIRELESS COMMUNICATIONS

(75) Inventors: Gene S. Mitchell, Jr., Blue Springs, MO (US); Paul S. Smithey, Olathe, KS (US); Tim W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1008 days.

(21) Appl. No.: 11/365,379

(22) Filed: Mar. 1, 2006

(51) Int. Cl.
*H04B 7/15* (2006.01)
*H04W 24/00* (2009.01)
*H04B 7/14* (2006.01)

(52) U.S. Cl. .................. 455/11.1; 455/456.1; 455/16

(58) Field of Classification Search .......... 455/11.1, 455/7, 16, 404.2, 456.1, 456.2, 426.1, 426.2
See application file for complete search history.

(56) References Cited

U.S. PATENT DOCUMENTS

| | | | |
|---|---|---|---|
| 6,501,955 B1 | 12/2002 | Durrant et al. | |
| 6,590,383 B2 * | 7/2003 | Yamashita et al. | 324/158.1 |
| 7,016,688 B2 * | 3/2006 | Simic et al. | 455/456.1 |
| 7,062,224 B2 * | 6/2006 | Baker et al. | 455/9 |
| 7,072,612 B2 * | 7/2006 | Soliman | 455/13.1 |
| 7,113,745 B2 * | 9/2006 | Khayrallah | 455/41.2 |
| 7,233,771 B2 * | 6/2007 | Proctor et al. | 455/11.1 |
| 7,269,387 B2 * | 9/2007 | Wolf et al. | 455/11.1 |
| 7,295,808 B2 * | 11/2007 | Soliman | 455/13.1 |
| 7,307,666 B2 * | 12/2007 | Wu et al. | 348/473 |
| 7,400,856 B2 * | 7/2008 | Sartori et al. | 455/7 |
| 7,429,951 B2 * | 9/2008 | Kennedy et al. | 342/465 |
| 7,486,233 B2 * | 2/2009 | Stenberg et al. | 342/450 |
| 7,546,984 B2 * | 6/2009 | Poppe et al. | 244/215 |
| 7,623,872 B2 * | 11/2009 | Kennedy et al. | 455/456.1 |
| 7,627,327 B2 * | 12/2009 | Kennedy et al. | 455/456.1 |
| 2003/0083008 A1 * | 5/2003 | Baker et al. | 455/17 |
| 2004/0147221 A1 * | 7/2004 | Sheynblat et al. | 455/12.1 |
| 2004/0166873 A1 | 8/2004 | Simic et al. | |
| 2005/0113117 A1 | 5/2005 | Bolin et al. | |

* cited by examiner

*Primary Examiner*—Tilahun Gesesse (57) ABSTRACT

A method and system for detecting, at a repeater, that a communication passing between a wireless communication device and radio access network infrastructure via the wireless repeater has a predefined characteristic and responsively outputting a reporting signal is disclosed. The reporting signal may be sent to a database which is accessible to a positioning system. The reporting signal may contain information regarding attributes of the repeater. Using the attributes of the repeater, the positioning system may be able to perform more accurate triangulation when locating the wireless communication device.

19 Claims, 8 Drawing Sheets

METHOD AND SYSTEM FOR REPORTING USAGE OF A REPEATER IN WIRELESS COMMUNICATIONS

FIELD OF THE INVENTION

The present invention relates to telecommunications and, more particularly, to reporting that a wireless communication passes through a repeater.

BACKGROUND

When a user in a wireless communications network initiates a communication session, the nature of the communication may necessitate locating the user. Commonly, a user must be located when the user places a "9-1-1" emergency telephone call. Other scenarios exist as well. For example, a user may contact a service provider requesting directions to nearby restaurants or to a gas station. To provide accurate information, the service provider must be able to determine the user's location.

The advent of cellular telephones required new locating technology. Previously, 911 calls originated mainly from landline telephones. Therefore, the process of determining the location of a caller was usually a simple matter of looking up the street address of the calling telephone number. Unlike landline telephones that were fixedly associated with particular street addresses, cellular telephones could place calls from anywhere within a cellular coverage area. Thus, a more complex system of position determination was required in order to determine the location of a calling cellular telephone.

To facilitate 911 services for cellular telephone callers, the United States Federal Communication Commission (FCC) mandated the implementation of "Enhanced 911" ("E911") services. The E911 mandate was divided into two phases. According to Phase 1, the location had to be identified with an accuracy of at least cell and sector. As this information is typically maintained by a cellular wireless carrier in a subscriber's home location register ("HLR"), Phase 1 presented little technical challenge. According to Phase 2, the location must be provided with far more granularity than the cell and sector information maintained in the HLR. In response, the Telecommunications Industry Association (TIA) has proposed a standard entitled "Enhanced Wireless 9-1-1 Phase 2" or "J-STD-036-A" (including a recent addendum, J-STD-036-A-2002), the entirety of which is hereby incorporated by reference.

In order to achieve the accuracy specified by Phase 2, a service provider may employ a wireless position determining system that communicates with a wireless communication device (WCD), such as a cellular telephone, in order to determine its current location. The positioning system could be "handset-based," in which case the cellular telephone would read its geographic coordinates from a satellite based positioning system (e.g., GPS) and report the coordinates over an air interface to the carrier. Alternatively or additionally, the positioning system could be "network-based," in which case the carrier might employ a technique such as triangulation, (e.g., Advanced Forward Link Trilateration (AFLT) or Enhanced Forward Link Triangulation (EFLT)), to measure the telephone's location. Such network-based techniques may also be combined with handset-based techniques.

When a positioning system performs triangulation, the system determines the location of a WCD based on two or more fixed locations, such as the locations of base transceiver stations (BTSs). Triangulation can be carried out using various methods. In its most basic form, the angle of arrival of an incoming signal is measured at two or more stationary locations. Then, a system performing triangulation creates paths, extending radially at the angle of arrival, from each stationary location. The intersection of these paths is the estimated location of the device.

Recently, more sophisticated triangulation techniques have been developed, which use the delay between a WCD and two or more BTSs (preferably three BTSs) to locate a device. Specifically, the time a signal spends traveling over an air interface between the WCD and each BTS is measured and reported to a positioning system. Using that delay, along with the known speed of the signal, the distance between the WCD and each BTS can be calculated. Then, an arc with a radius extending the distance to the WCD is centered on each BTS. The intersection of these arcs provides the estimated location of the WCD.

SUMMARY

When a repeater is present in a wireless communication network, locating a user can be difficult. Repeaters are commonly used in wireless communication networks to extend coverage and/or amplify signals in areas that are not adequately served by a BTS (e.g., rural areas or enclosed areas such as buildings or subways). Typically, repeaters are placed between a WCD and a BTS. Therefore, a WCD may communicate over an air interface with a repeater that receives, amplifies, and transmits the communication to a BTS (and vice versa). The presence of the repeater introduces additional time delay between the WCD and the BTS. Since positioning systems using triangulation often rely on the delay between the WCD and the BTS, this additional delay can significantly impact accuracy. The present invention helps address this problem by providing a method and system for reporting the presence of a repeater in response to detecting, at a repeater, a predefined characteristic of a communication.

More specifically, the invention may provide a method for (i) detecting, at a repeater, that a communication passing between a wireless communication device and radio access network infrastructure via the repeater has a predefined characteristic, and (ii) responsively outputting a reporting signal. Further, the reporting signal may be sent to a repeater-usage database. Provided with access to the repeater-usage database, a positioning system can then account for the repeater when performing triangulation and can therefore determine a user's location more accurately.

The invention may also provide a system capable of detecting, at a repeater, a predefined characteristic in a communication and responsively outputting a reporting signal. An exemplary embodiment of the system may comprise (i) a first transceiver operable to communicate with a wireless communication device; (ii) a second transceiver operable to communicate with radio access network infrastructure; (iii) amplification circuitry, coupled between the first transceiver and second transceiver, for amplifying communications passing between a wireless communication device and the radio access network infrastructure; (iv) a modem coupled to at least one processor; and (v) one or more processors, including at least one processor coupled to the modem and programmed to detect a predefined characteristic in a communication passing between a wireless communication device and the radio access network infrastructure via the system and to responsively cause the modem to send a reporting signal. The first transceiver, second transceiver, and amplification circuitry may carry out the functions of a repeater (e.g., receiving, amplifying, and transmitting), and therefore may be components of a repeater.

Together, a processor and a modem may provide functionality to detect a predefined characteristic in a communication, and to responsively send a reporting signal. As such, the processor and/or modem may be located within the repeater, or may be located externally to the repeater. In an exemplary embodiment, the processor and modem, along with a chipset capable of determining dialed digits included in a call origination message, may be components of a reporting module. The system may further include an RF splitter to route communications from the first transceiver to the repeater module, as well as to other components of the system, such as the amplification circuitry. The reporting module can be internal to the repeater or external and communicatively coupled to the repeater.

In operation, the reporting module may function to detect, at a repeater, a predefined characteristic in a call origination message. For example, the chipset may extract dialed digits from the call origination message, and pass the dialed digits to the processor. The processor can then determine if the dialed digits match predefined dialed digits (e.g., "9-1-1"). Specifically the RF splitter may route a call origination message to the chipset for demodulation, and to the amplification circuitry, so the repeater can amplify and transmit the message to a BTS.

When the reporting module detects a predefined characteristic in a communication, the system may generate a reporting signal. The reporting signal may take the form of a repeater-usage message, which contains an identifier for the device and an identifier for the repeater. The processor may then cause the modem to send the repeater-usage message to a repeater-usage database. The repeater-usage database may be accessible to a positioning system. As a result, the positioning system can account for the repeater when locating a user. These as well as other aspects, advantages, and alternatives, will become more apparent to those of ordinary skill in the art by reading the following detailed description.

BRIEF DESCRIPTION OF THE DRAWINGS

An exemplary embodiment of the present invention is described herein with reference to the drawings, in which.

DETAILED DESCRIPTION

Figure 1:
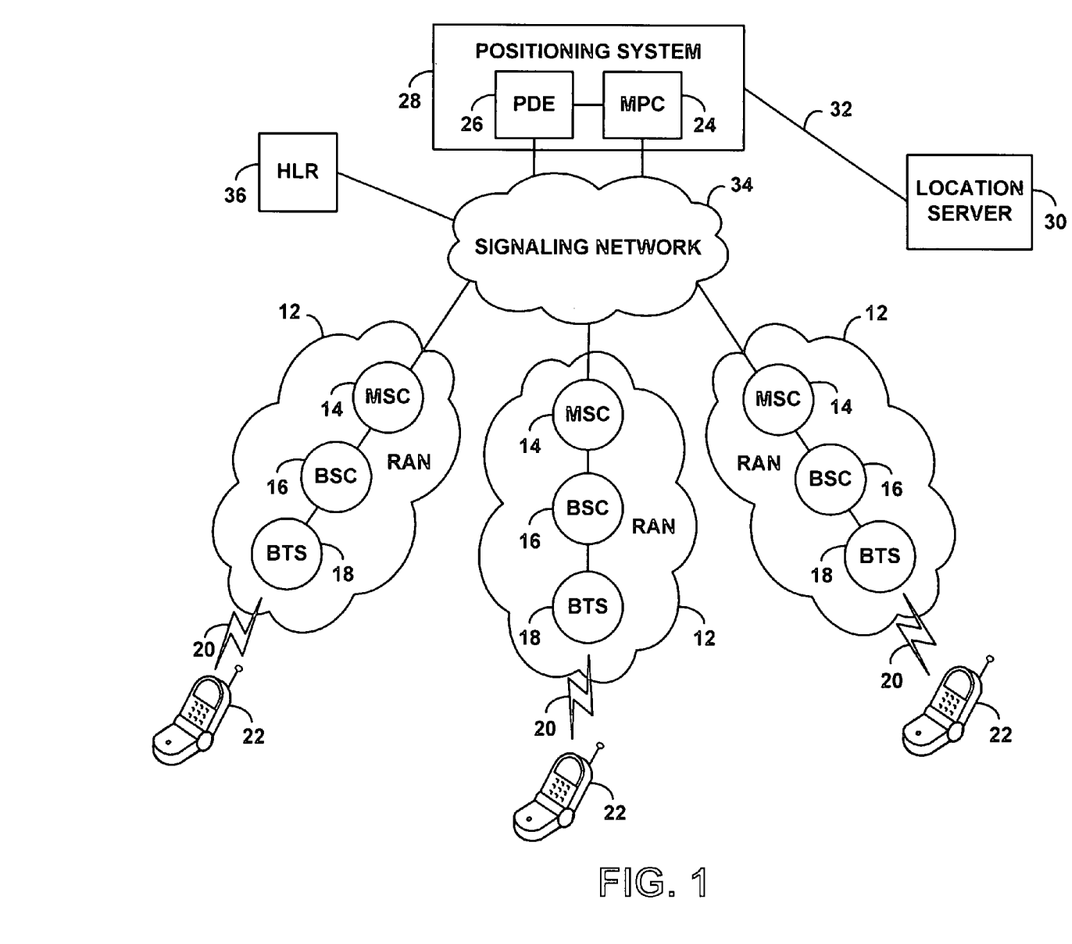
FIG. 1 is a simplified block diagram depicting a wireless communication system in which the exemplary embodiment can be employed.

Referring to the drawings, FIG. 1 is a simplified block diagram of a wireless communication system in which an exemplary embodiment of the invention can be employed. In such a wireless communication system, a wireless carrier typically operates a number of radio access networks (RANs) 12, each of which is controlled by a switching entity such as a mobile switching center (MSC) 14. The MSC generally includes or connects with one or more base station controllers (BSCs) 16, which in turn connect with one or more base transceiver stations (BTSs) 18. Each BTS conventionally includes a cell tower with one or more antennas that radiate to define an air interface 20 in which wireless communication devices (WCDs) 22 can operate. While FIG. 1 shows each BTS 18 communicating with a different BSC 16, each BSC 16 may serve more than one BTS 18.

In a common arrangement, a wireless carrier will operate a mobile positioning center (MPC) 24 that is arranged to determine and report WCD locations to requesting entities. The MPC may include or have access to a position determining entity (PDE) 26, which may operate to determine the location of a given WCD based on (i) network information and/or (ii) satellite-based positioning information. (FIG. 1 depicts the MPC 24 and PDE 26 as components of a positioning system 28; in other cases, the positioning system 28 can take other forms, possibly including just one of these entities or some other entities altogether.) Further, the carrier may operate a location server 30 that acts as a front end for receiving location requests from location-based service (LBS) applications and forwarding those requests to the MPC.

In a typical arrangement, the communications from the positioning system 28 to the WCD 22 will go to and from the MPC/PDE over a signaling network 34 (e.g., a Signaling System #7 (SS7) network or an IP signaling network) to the MSC 14 of the RAN. In order to send any such requests, the MPC 24 may query a home location register (HLR) 36, also via the signaling network, to determine the point code subsystem number (PC_SSN) of the MSC currently serving the WCD. For instance, the MPC may send an IS-41 Location Request (LOCREQ) to the HLR, or an IS-637 SMS Request (SMSREQ) message to the HLR, providing the HLR with an identifier of the WCD, and the HLR would respond (in a Location Request return result (locreq_rr) or SMS Request return result (smsreq_rr)) with the PC_SSN of the currently serving MSC (or a last known serving MSC). The query to the HLR could carry an identifier of the WCD (such as a mobile directory number (MDN)) as indicated in the initial location request to the MPC. The PDE can then establish communications with the WCD via the MSC currently serving the WCD.

The PDE 26 may employ various techniques to locate a WCD 22. For example, the PDE may use triangulation, GPS tracking, or a combination of these techniques (e.g., Advanced GPS software such as SNAPTRACK, manufactured by Qualcomm Incorporated of San Diego, Calif., which uses triangulation to enhance GPS coordinates). To perform triangulation, exclusively or in combination with other locating techniques, a positioning system uses at least two stationary sources capable of communicating with a WCD, such as two or more BTSs accessible to the WCD via an air interface. In particular, the PDE can use the round-trip delay between the WCD and each BTS, along with the location of each BTS, as a basis for triangulation. In practice, triangulation usually requires three or more BTSs. Theoretically, only two BTSs are required, but the accuracy using two BTSs is usually inadequate. The explanation of FIG. 3A below elaborates further on triangulation.

Figure 2:
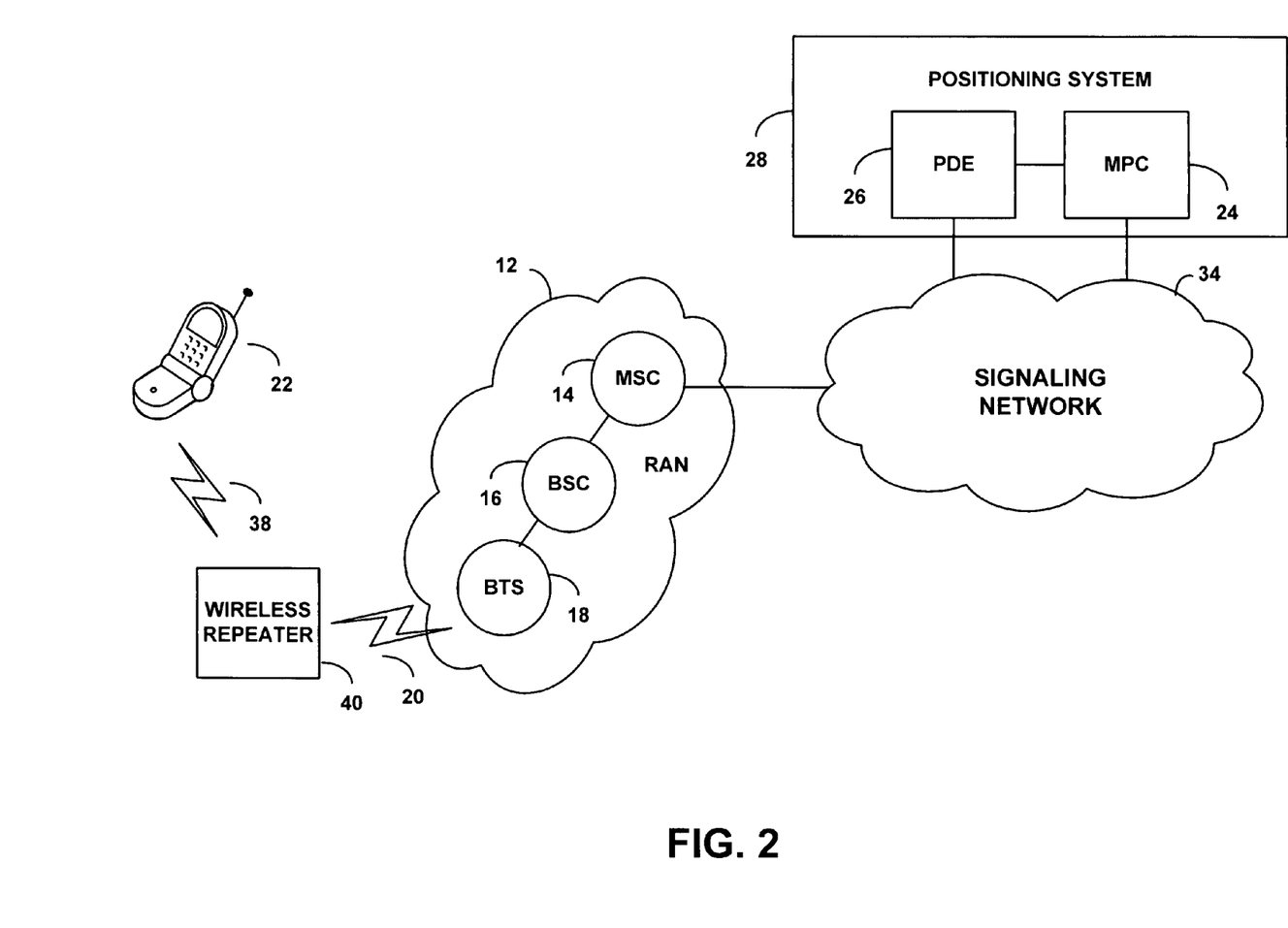
FIG. 2 is also a simplified block diagram depicting a wireless communication system in which the exemplary embodiment can be employed.

FIG. 2 is also a simplified block diagram of a wireless communication system in which an exemplary embodiment of the invention can be employed. FIG. 2 is similar to FIG. 1, but includes a wireless repeater 40. Wireless repeater 40 is operable to communicate with WCD 22 over air interface 38 and with BTS 18 over air interface 20. Of particular significance, placing wireless repeater 40 between WCD 22 and BTS 18 creates additional delay between WCD 22 and BTS 18. Such additional delay can interfere with triangulation.

Figure 3A:
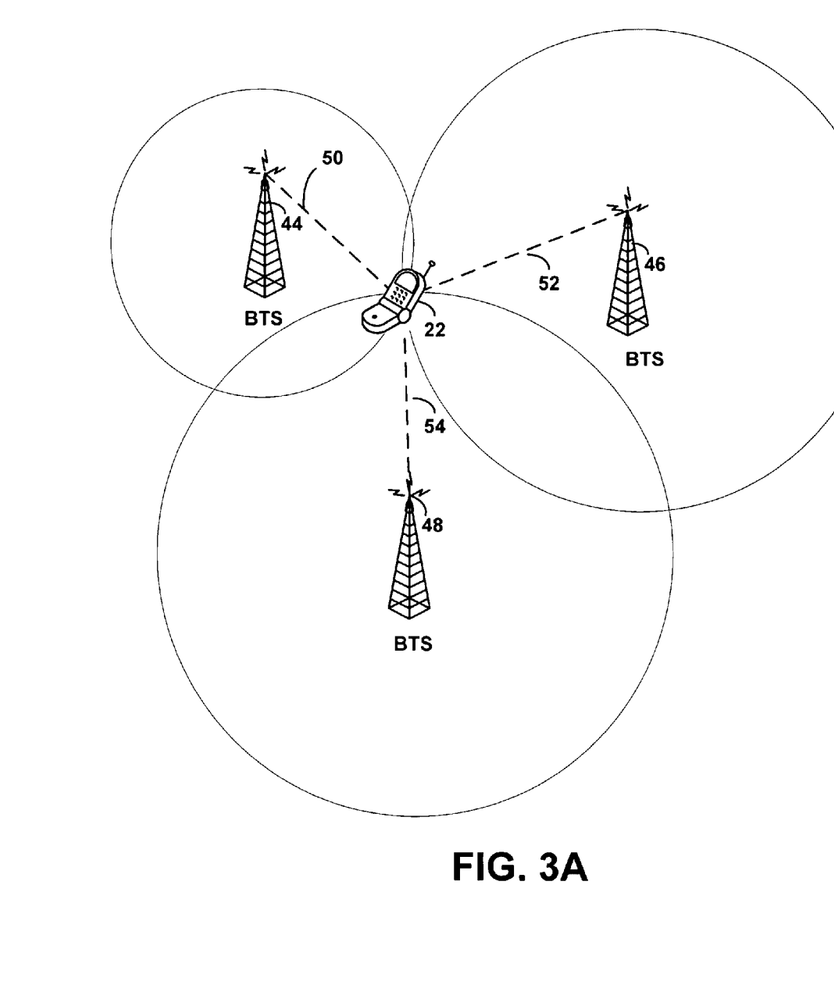
FIG. 3A is a diagram depicting a portion of a wireless communication system in which the exemplary embodiment can be employed.

FIG. 3A shows an exemplary set of BTSs 44-48 that could be part of one or more RANs, such as those shown in FIG. 1 or 2, or any other wireless communication network. WCD 22 is capable of communicating with each BTS 44-48. Given such a configuration, the attributes of BTSs 44-48 can be used by a positioning system when locating WCD 22. Specifically, a positioning system may use attributes of BTSs 44-48 to perform triangulation.

Triangulation may be "angle-based" or "delay-based" (or may take other forms now known or later developed). Older triangulation algorithms were generally angle-based, using the angle of arrival at a plurality of stationary sources to estimate the location of a device. Currently, most triangulation algorithms are delay-based, using the delay between each of a plurality of BTSs and a WCD as a basis for locating a WCD. Examples of such techniques include time of arrival, time difference of arrival, enhanced observed time difference of arrival, advanced forward link trilateration, and enhanced forward link triangulation, among others. For simplicity, delay-based triangulation will be described generally. However, those skilled in the art will recognize that the present invention can be used to enhance networks using most any delay-based triangulation technology, and perhaps other location-determination techniques as well.

To perform delay-based triangulation, a positioning system must first identify a sufficient number of BTSs capable of serving the WCD 22 (usually three or more). In addition, the positioning system must know the round-trip delay between each identified BTS and the WCD. The methods by which a PDE obtains this information may vary. As an example, the positioning system may obtain identifiers of BTSs 44-48 and their associated round-trip delays by querying the WCD 22. As a matter of course, positioning systems using handset-based locating methods, alone or in combination with triangulation, already establish a communication session with a WCD 22. For example, such a positioning system may query a WCD device for its GPS coordinates. As explained, the positioning system can establish such a communication session with a WCD by querying the HLR for the MSC serving the WCD.

In particular, the positioning system may query the WCD 22 for an indication of nearby BTSs and for an indication of the delay between each nearby BTS and the WCD. WCDs regularly maintain an active set listing of nearby BTSs to facilitate handoffs from BTS to BTS. Methods and systems for creating and maintaining an active set are known to those skilled in the art, and are therefore discussed only briefly here. Typically, a BTS sends out a pilot signal that can be picked up by nearby WCDs. If the strength of the pilot signal is above a predetermined threshold, the WCD may add the BTS to the active set. In addition, the WCD can record and store the round-trip delay associated with communications between the WCD each BTS in the active set. Methods for storing WCD-BTS delays are known to those in the art. With the information provided by the active set, the WCD can conveniently provide an indication of nearby BTSs and their associated delays to a positioning system.

The data retrieved from WCD 22 may include identifiers of each BTS 44-48 and the round-trip delay between each BTS 44-48 and the WCD 22. However, the data might not include the geographic locations of the BTSs, which the positioning system may need in order to perform triangulation. Accordingly, the positioning system may include or have access to a BTS-location database (not shown). This database could be coupled directly to the positioning system, or could be accessible to the positioning system via a radio access network, packet-switched network, or other means. Therefore, to retrieve the locations of the BTSs 44-48, the positioning system can conveniently query the BTS-location database with the identifier of each BTS 44-48. The positioning system can then use the location and associated round-trip delay of each BTS 44-48 to perform triangulation.

When performing delay-based triangulation, the positioning system also determines the distance between each BTS and the WCD by dividing the associated round-trip delays by the signal speed over the air interface. The signal speed over an air interface is a known constant. Since the distances do not reveal the orientation of WCD 22 in relation to BTSs 44-48, the distances standing alone cannot provide the location of the WCD 22. Thus, the positioning system may further create an arc centered around each BTS 44-48, each arc having a respective radius 50-54. Radii 50-54 represent the distances between each BTS 44-48 and WCD 22, respectively. Therefore, the positioning system may conclude that the intersection of these arcs represents the location of WCD 22.

Figure 3B:
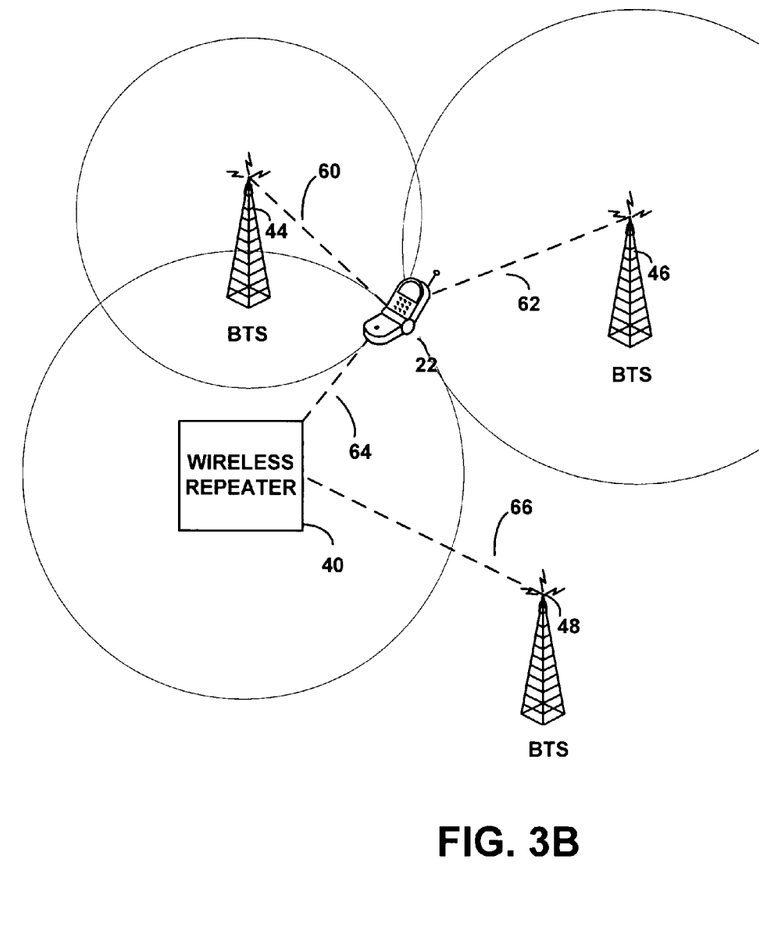
FIG. 3B is also a diagram depicting a portion of a wireless communication system in which the exemplary embodiment can be employed.

FIG. 3B also shows an exemplary set of BTSs 44-48 capable of serving WCD 22. However, unlike FIG. 3A, where each BTS is in direct communication with WCD 22, a wireless repeater 40 is located between BTS 48 and the WCD 22. As the repeater 40 creates additional delay between BTS 48 and WCD 22, using the delay between the BTS 48 and WCD 22 may result in a less accurate triangulation and thus less accurate location determination.

To help a positioning system account for the added delay, a reporting module may be provided at the wireless repeater 40. The reporting module may consist of a processor coupled to a modem, as well as other components, and may be arranged to detect a predefined characteristic of communications passing through the repeater and to responsively send a reporting signal. Provided with the reporting signal or information provided by (or derived from) the reporting signal, a positioning system seeking to locate WCD 22 can then substitute attributes of wireless repeater 40 for those of BTS 48 when performing triangulation. Specifically the positioning system can use the location of repeater 40 and round-trip delay 64 between repeater 40 and WCD 22 to render the triangulation process more accurate.

Figure 4:
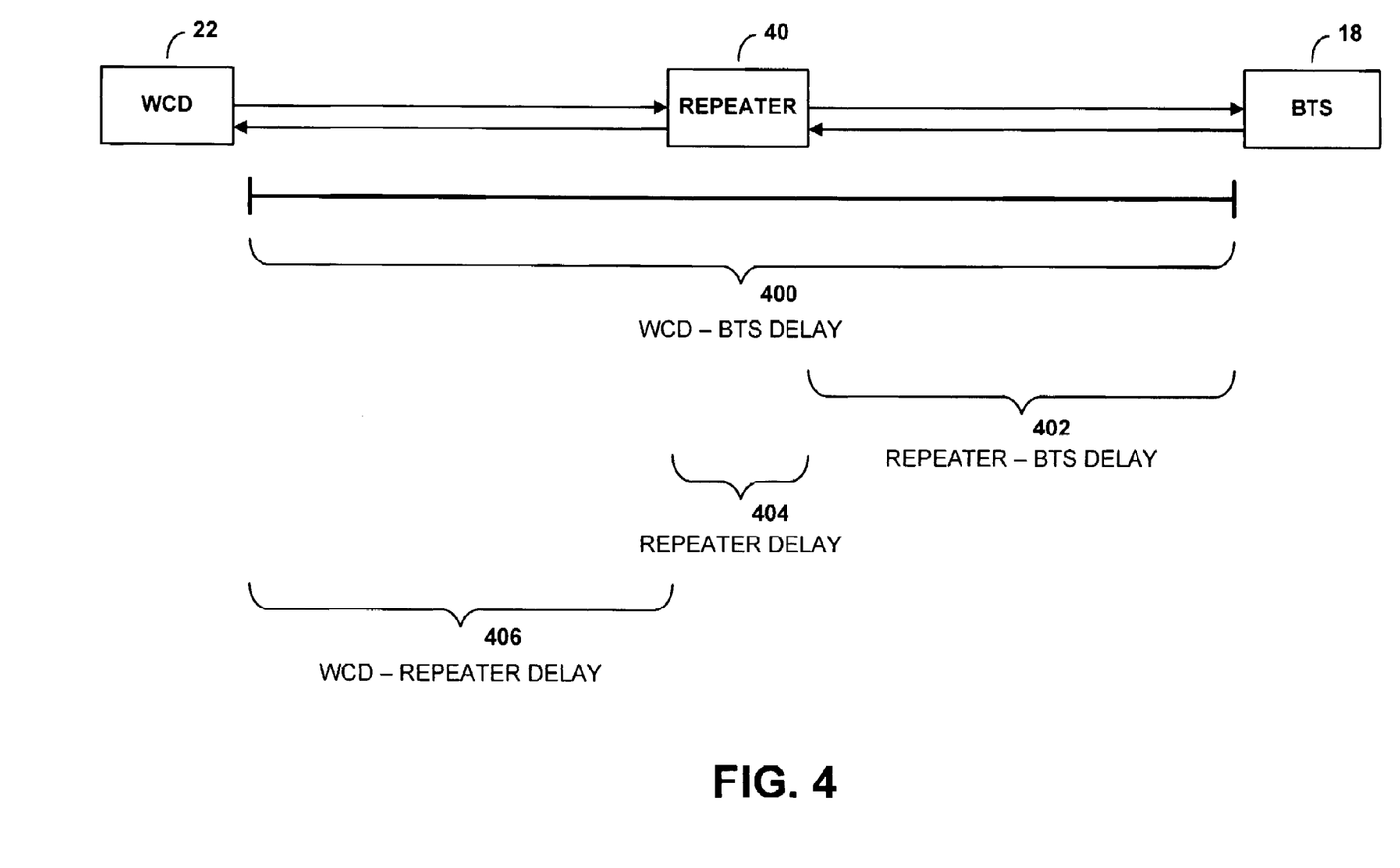
FIG. 4 is a communication flow diagram illustrating delays in a wireless communication system in which the exemplary embodiment can be employed.

FIG. 4 is signal flow diagram showing the delays that a positioning system can use to calculate the delay between a repeater and a WCD. The WCD-BTS delay 400 is the round-trip delay between the WCD 22 and the BTS 48, the repeater-BTS delay 402 is the round trip-delay between the repeater 40 and BTS 48, and the repeater delay 404 is the delay introduced as the communication passes through the repeater. Provided with values of these delays 400-404, the positioning system can readily calculate the WCD-repeater delay 406, which is the delay between WCD 22 and repeater 40.

In the exemplary embodiment, the positioning system can retrieve the WCD-BTS delay 400 from WCD 22, as discussed above, or from another source. Further, as the locations of the BTS 18 and repeater 40 are fixed, the repeater-BTS delay 402 is generally a constant that can be known to the positioning system or can be retrieved from a database accessible by the positioning system. Similarly, the repeater delay 404 is generally a constant that can be known to the positioning system or retrieved from a database accessible by the positioning system. Given these values, the positioning system can programmatically subtract the repeater-BTS delay 402 and the repeater delay 404 from the WCD-BTS delay 400, to determine the WCD-repeater delay 406.

Figure 5:
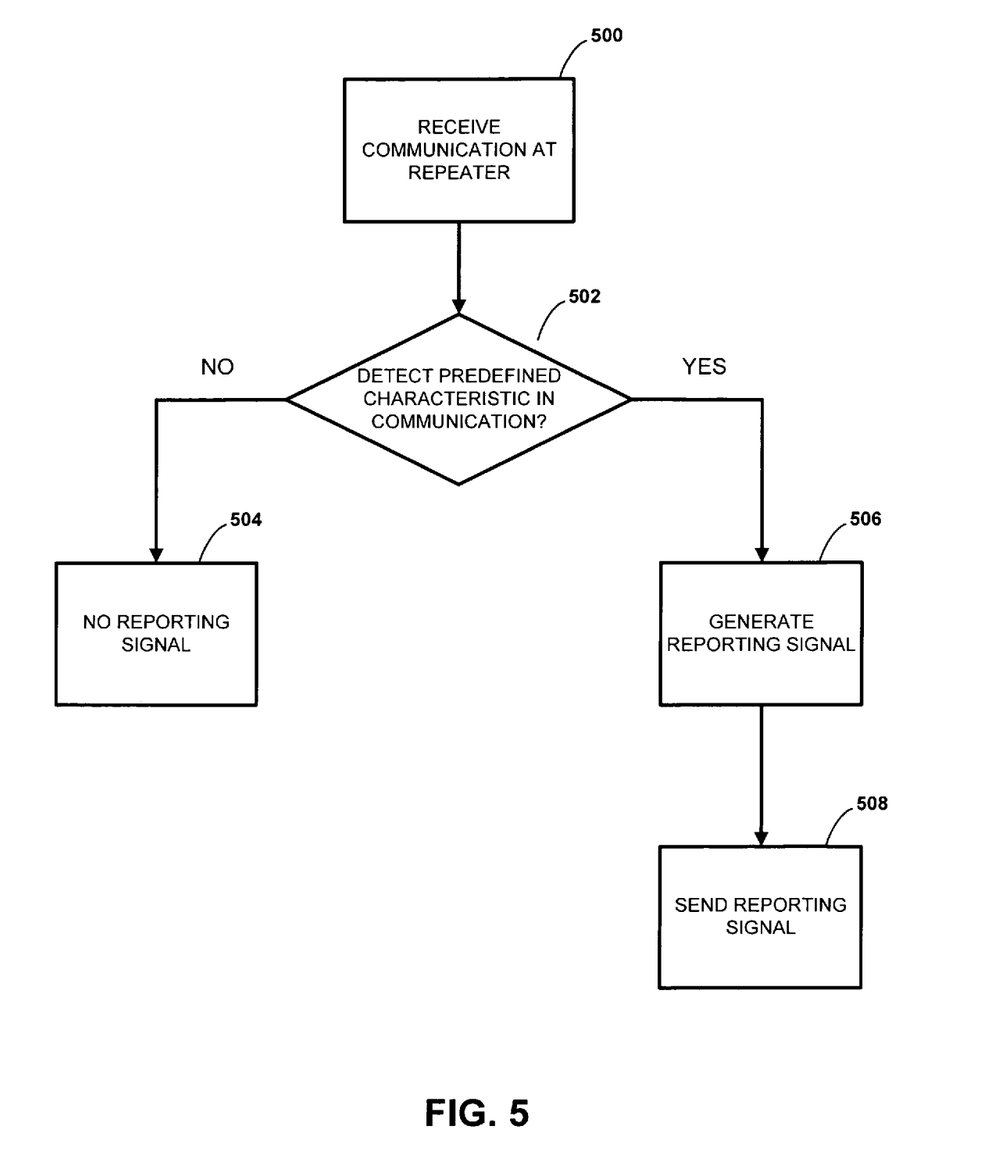
FIG. 5 is a flow chart illustrating a method for sending a reporting signal in accordance with an exemplary embodiment.

FIG. 5 is flow chart illustrating a method according to an exemplary embodiment of the invention. Initially, as shown by step 500, a communication from a WCD is received by a repeater. At step 502, the system detects, at the repeater, whether or not the communication has a predefined characteristic. If no predefined characteristic is found, the system refrains from sending a reporting signal, as shown in step 504. If, however, the system detects that the communication has the predefined characteristic, the system generates a reporting signal, as shown in step 506. The reporting signal may include information indicating the presence of the repeater in the communication path. Next, in step 508, the system sends the reporting signal. In an exemplary embodiment, the reporting signal may be sent to a repeater-usage database (e.g., a database server) that can be accessed by a positioning system, so as to facilitate improved location determination.

Figure 6A:
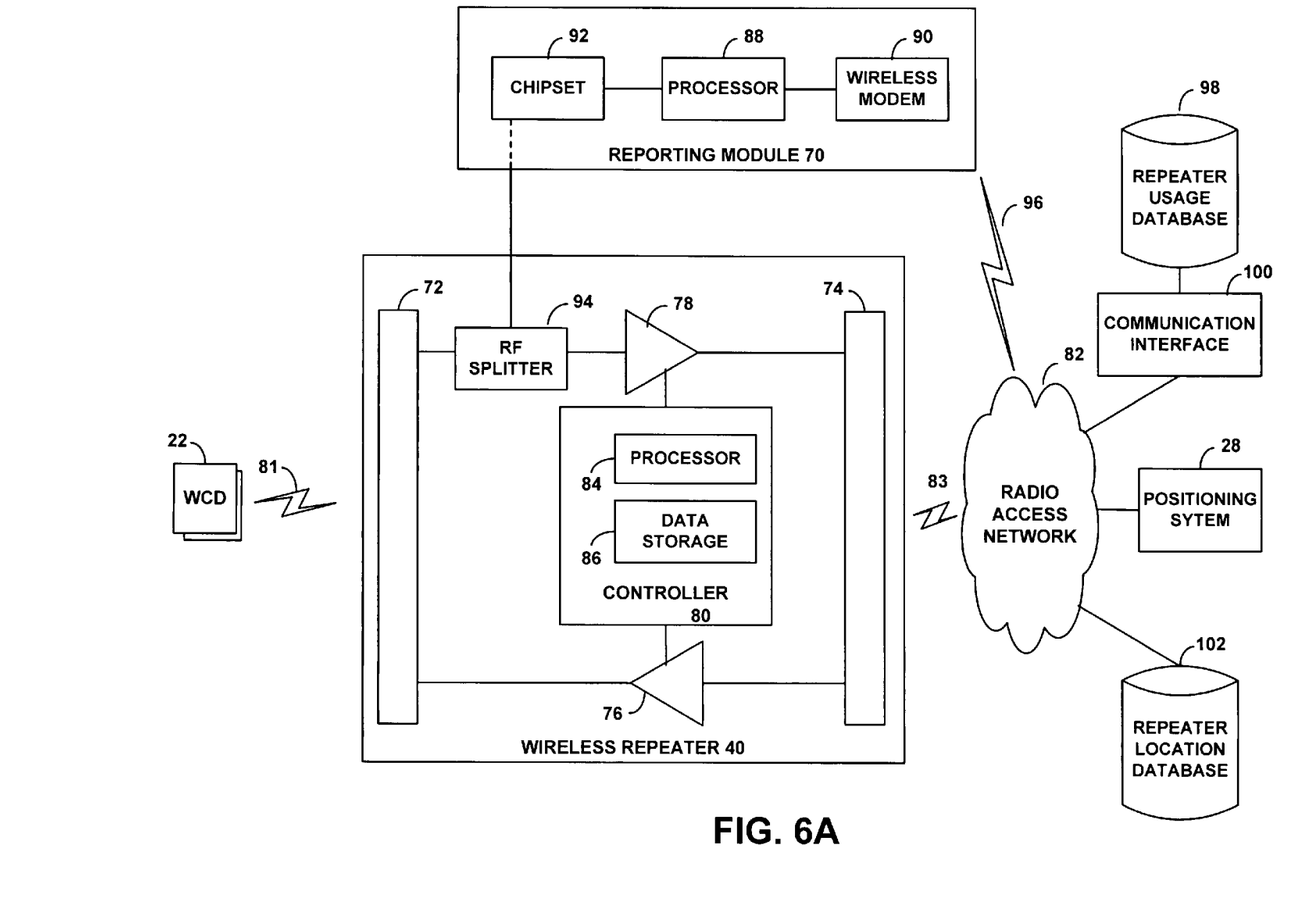
FIG. 6A is a functional block diagram illustrating components of a wireless communication system in which the exemplary embodiment of the system.

FIG. 6A is simplified block diagram of an exemplary system capable of detecting, at a repeater, a predefined characteristic in a communication from a WCD, and responsively outputting a reporting signal. The exemplary system includes a wireless repeater 40. The exemplary system also includes a reporting module 70, which may function to detect a predefined characteristic of the communication, at the repeater 40. If the predefined characteristic is detected, the reporting module 70 may send a reporting signal to improve the locating of WCD 22. The reporting module 70 may be external and perhaps co-located with repeater 40. Alternatively, reporting module 70 may be integrated with repeater 40 internally. Other configurations are possible as well.

As shown, the components of the wireless repeater 40 may include a first transceiver 72, a second transceiver 74, a forward-link build-out circuit 76, a reverse-link build-out circuit 78, and a controller 80. The forward-link build-out circuit 76 and reverse-link build-out circuit 78 are both coupled between the first transceiver 72 and the second transceiver 74, and the controller 80 is coupled to each of the build-out circuits. Some or all of these repeater components can be housed within a unitary repeater cabinet or housing, which can be situated at a desired location, such as in or on a house or office or on a utility pole, for instance.

First transceiver 72 includes a transmitter and receiver for communicating over air interface 81 with WCD 22, in both a forward-link direction (from RAN 82 to WCD 22) and a reverse-link direction (from WCD 22 to RAN 82). As such, first transceiver 72 preferably includes an antenna suitable for receiving and transmitting wireless signals of a desired frequency and/or other character. Although FIG. 6A shows first transceiver 72 as a single entity internal to repeater 40, the first transceiver could just well comprise separate receive and transmit circuits, either or both of which could be mounted external to the repeater. For instance, repeater 40 could include an externally mounted antenna for communicating with WCD 22.

Second transceiver 74 similarly includes a transmitter and receiver for communicating over air interface 83 with RAN 82, in both a forward-link direction (from RAN 82) and a reverse-link direction. As such, second transceiver 74 preferably includes an antenna suitable for receiving and transmitting wireless signals of a desired frequency and/or other character. Generally, transceivers may incorporate a highly directional antenna to communicate with a RAN. As such, each repeater may communicate with only a single component of the RAN, such as a single BTS. Further, although FIG. 6A shows second transceiver as a single entity internal to repeater 40, it could just well comprise separate receive and transmit circuits, either or both of which could be mounted external to the repeater. For instance, repeater 40 could include an externally mounted antenna for communicating with RAN 82.

Reverse-link build-out circuit 78 functions to build-up signals transmitted on the reverse-link, i.e., in the direction from WCD 22 to RAN 82. By way of example, reverse-link build-out circuit 78 could be a variable gain amplifier, set to amplify input signals from first transceiver 72 to a desired extent so as to produce signals for output by second transceiver 74.

Similarly forward-link build-out circuit 76 functions to build-up signals transmitted on the forward-link, i.e., in the direction from RAN 82 to the WCD 22. By way of example, forward-link build-out circuit 76 could be a variable gain amplifier, set to amplify input signals from second transceiver 74 to a desired extent so as to produce signals for output by first transceiver 72.

Controller 80 may also take various forms. For instance, as shown in FIG. 6A, controller 80 can include a repeater processor 84 and data storage 86. Repeater processor 84 can itself comprise one or more general purpose processors and/or one or more dedicated processors (e.g., digital signal processing chipsets). Data storage 86 can in turn include volatile and/or non-volatile storage and can be integrated in whole or in part with processor 84. Controller 80 can take other forms as well. Controller 80 functions to manage operation of wireless repeater 40. As such, controller 80 may be arranged to programmatically set and monitor the gain of the build-out circuits 76, 78 and/or to control other basic repeating functions.

In the exemplary system, the reporting module 70 may include a reporting processor 88 and a modem 90. The system can further include a chipset 92, which can also be a component of the reporting module 70. The reporting processor 88 and/or chipset 92 may function detect a predefined characteristic in the communication. If the predefined characteristic is detected, the modem 90 may send a reporting signal.

By way of example, wireless modem 90 can be an MSM series chipset manufactured by Qualcomm (e.g., an MSM6700 or MSM6800 chipset), or some other chipset capable of cellular wireless connectivity. Such a chipset is of the type that would be conventionally included within a cellular telephone or other end-user WCD (e.g., wireless PDA, or wirelessly equipped computer) and advantageously enables the device to attain wireless packet-data connectivity so as to be able to engage in wireless EP-based communication. In a preferred embodiment, the MSM chipset would include logic compliant with CDMA2000, and preferably the well known 1XRTT and EV-DO air interface standards. But the chipset could equally take other forms as well. A separate associated transceiver and antenna may also be provided.

An exemplary embodiment may also include a radio frequency (RF) splitter 94 that facilitates routing communications from the first wireless transceiver 72 to the reporting module 70, and to other components of the system. Specifically, the RF splitter 94 may route communications from the first transceiver 72 to both the chipset 92 and the reverse-link build out circuit 78. By routing a communication to the reverse-link build-out circuit 78, the splitter 78 allows the repeater to perform its normal functions, amplifying and transmitting the communication. In addition, by routing the communication to the reporting module, the splitter 94 allows the reporting module 70 to detect a predefined characteristic of the communication, and to responsively send a reporting signal.

The chipset 92 may function to receive communications from the splitter 94 and further, may analyze the communications. By way of example the chipset may be a Cell Site Modem (CSM) series chipset manufactured by Qualcomm (e.g., a CSM5500 chipset) capable of demodulating a call origination message to obtain dialed digits associated with a call being placed by WCD. In an exemplary embodiment, the incoming communication may be a call origination message. As such, a call origination message received by the first transceiver 72 may be forwarded by RF splitter 94, to the CSM chipset. In addition, the RF splitter 94 may route the message to the reverse-link build-out circuit 78. The reverse-link build-out circuit 78 can then amplify the call origination message as it passes to the second transceiver 74. In turn, the second transceiver 74 can transmit the call origination message to a BTS (a component of RAN 82), so the call can connect normally. At the same time, the CSM chipset can demodulate the call origination message to isolate the dialed digits of the call. The CSM chipset may then pass the dialed digits to the reporting processor 88.

Reporting processor 88 can itself comprise one or more general purpose processors and/or one or more dedicated processors (e.g., digital signal processing chipsets). The reporting processor 88 may be communicatively coupled to the wireless modem 90, and other components, such as chipset 92. Further, the reporting processor 88 may contain program logic to control components of the reporting module 70 (e.g., chipset 92, modem 90, or other components).

The reporting processor 88 can be programmed to detect a predefined characteristic of a communication and to responsively initiate transmission of a reporting signal. For example, the reporting processor 88 may include program logic allowing it to determine whether or not the dialed digits match predefined dialed digits, so as to invoke reporting when the call is being placed to a specified number or location, such as an emergency phone call that has the dialed digits "9-1-1". The reporting processor may include logic that considers, instead of or in addition to the dialed digits, any other predefined characteristic or combination of predefined characteristics. For example, the reporting processor may consider the number from which the call was originated, a characteristic of the WCD from which the communication originated, and/or any other predefined characteristic. If the processor 88 detects a predefined characteristic in the communication, the program logic may cause processor 88 to generate a reporting signal. Further the program logic may cause the modem 90 to send the reporting signal. In addition, the reporting processor 88 can also include control logic for instructing the wireless modem 90 to attain wireless packet-data connectivity.

In order to obtain wireless packet-data connectivity, the reporting processor 88 may send one or more signals to wireless modem 90, causing wireless modem 90 to send a packet-data origination message into RAN 82. Such a message may then pass wirelessly over air interface 96 to an MSC and/or other controlling entity of the radio network infrastructure, which may trigger assignment of a radio link, establishment of a data link, and assignment of an IP address for use by reporting module 70. Processor 88 can be programmed to automatically attain packet-data connectivity upon power-on, or to do so in response to some other triggering event (e.g., each time a predefined characteristic is detected).

The reporting processor 88 may further include control logic instructing the wireless modem 90 to send a reporting signal. Specifically, after instructing the modem 90 to connect to RAN 82, the reporting processor 88 may cause the modem 90 to send a reporting signal, such as a repeater-usage message, to a repeater-usage database 98 (e.g., to a predefined network address) and/or one or more other destinations. For instance, if the dialed digits associated with a call origination message match the predefined dialed digits "9-1-1", the processor may cause the wireless modem 90 to send a repeater-usage message to the repeater-usage database 98.

In the exemplary embodiment, a reporting signal may take the form of a repeater-usage message. The repeater-usage message may be sent using SMTP, FTP, TCP/IP or any other protocol suitable for messaging. The reporting processor 88, when building a repeater-usage message, may include (i) an identifier of the WCD 22 that initiated the communication (e.g. a directory number), and/or (ii) an identifier of the repeater 40. In an exemplary embodiment, the identifier of the WCD 22 may be a mobile identification number (MDN), which the processor 88 may extract from a call origination message. The reporting processor 88 may be hard-coded with the identifier of repeater 40 or may retrieve the identifier of repeater 40 from data storage 90 or another source. In addition, the repeater-usage message may include the repeater delay (e.g., the time it takes a repeater to receive, amplify, and transmit a signal), which may be stored in data storage 86, or elsewhere. The repeater delay is typically specified by the manufacturer of a repeater.

A repeater-usage database 98 may sit at an IP address on a packet-switched network or may be otherwise accessible through RAN 82. In order to receive reporting signals, the repeater-usage database 98 may be coupled to a network communication interface 100 which functions to interface the database 98, ultimately with RAN 82. More particularly, the network communication interface preferably provides connectivity with the RAN 82 via a packet-switched network. As such, the communication interface 100 can take various forms. For instance, communication interface 100 can include an Ethernet network interface card (NIC) that connects by an Ethernet cable to a router of RAN 82. Alternatively or additionally, communication interface 100 could provide wireless connectivity for communicating with RAN 82 via a wireless local area network (WLAN) such as an 802.11 network and/or a wireless wide area network (WWAN) such as a CDMA network. Other arrangements are also possible.

In the preferred embodiment, the network communication interface may include or have access to a processor (not shown). The processor may function to execute program instructions to receive reporting signals and store the signals or information provided by the signals in the repeater-usage database 98. For example, when the interface 100 receives a repeater-usage message from a reporting module 70, the processor may create a database entry including an identifier of the WCD 22 and an identifier of the repeater 40. Preferably, the processor also includes a timestamp in the database entry. The timestamp can later be used to associate a database entry with the communication via repeater 40 that resulted in the creation of the entry.

In addition, the processor may function to receive queries from the positioning system. The positioning system 28 can then query the repeater-usage database 98 via the processor. In response to the query containing an identifier for a WCD, the processor may search repeater-usage database 98 for a corresponding entry. If the repeater-usage database 98 has received a reporting signal containing the identifier for the WCD, the processor may return the corresponding entry or information contained in the entry associated with the WCD to the positioning system. If, on the other hand, the processor does not find an entry for the WCD, the positioning system 98 may locate the WCD as it normally would.

As a specific example, a positioning system 28, which includes an MPC, and a PDE, may receive a request for the location of WCD 22. The request may include an MDN associated with WCD 22. The MPC may then pass the MDN to PDE, which in turn may query the repeater-usage database 98. If the repeater-usage database 98 has received a repeater-usage message including the MDN, the query may return the database entry associated with the MDN. In addition to the MDN, the entry may include an identifier of wireless repeater 40. The entry may also include the repeater-delay associated with repeater 40.

Preferably, the existence of an entry in the repeater-usage database indicates that a WCD is accessing the RAN via a repeater. In an exemplary embodiment, this is true because a database entry is only created when a communication passes through a repeater. Therefore, if a query to the repeater-usage database returns an entry for a particular WCD, a positioning system can adjust when performing delay-based triangulation. More specifically, the positioning system can improve delay-based triangulation by using the attributes of a repeater rather than those of its associated BTS.

More specifically, the positioning system 28 can replace the location of the BTS with which a wireless repeater is associated, with the location of the repeater itself. To obtain the location of the repeater 40, the positioning system 28 may include or have access to a repeater-location database 102. The repeater-location database 102 may contain for each repeater, an identifier of the repeater and the location of the repeater, as well as other data. Therefore, the positioning system 28 can retrieve the location of a repeater 40 by conveniently querying the repeater-location database 102 with the identifier for repeater 40.

The positioning system can also use the WCD-repeater delay instead of the WCD-BTS delay when performing triangulation. When using the WCD-BTS delay to locate a WCD, the positioning system may assume direct communication between the WCD and a BTS. For example, referring back to FIG. 3B and assuming direct communication, the positioning system may indicate that the distance between WCD 22 and BTS 48 is equal to radius 66 plus radius 62. This distance is erroneous because the positioning system has not accounted for the presence of repeater 40. The positioning system can adjust for the presence of the repeater 40 by substituting the delay between the WCD 22 and the repeater 40, which correctly indicates that the distance between wireless repeater 40 and WCD 22 is radius 62. By performing delay-based triangulation with the distance between repeater 40 and WCD 22 and the location of repeater 40, the positioning system yields more accurate results.

Figure 6B:
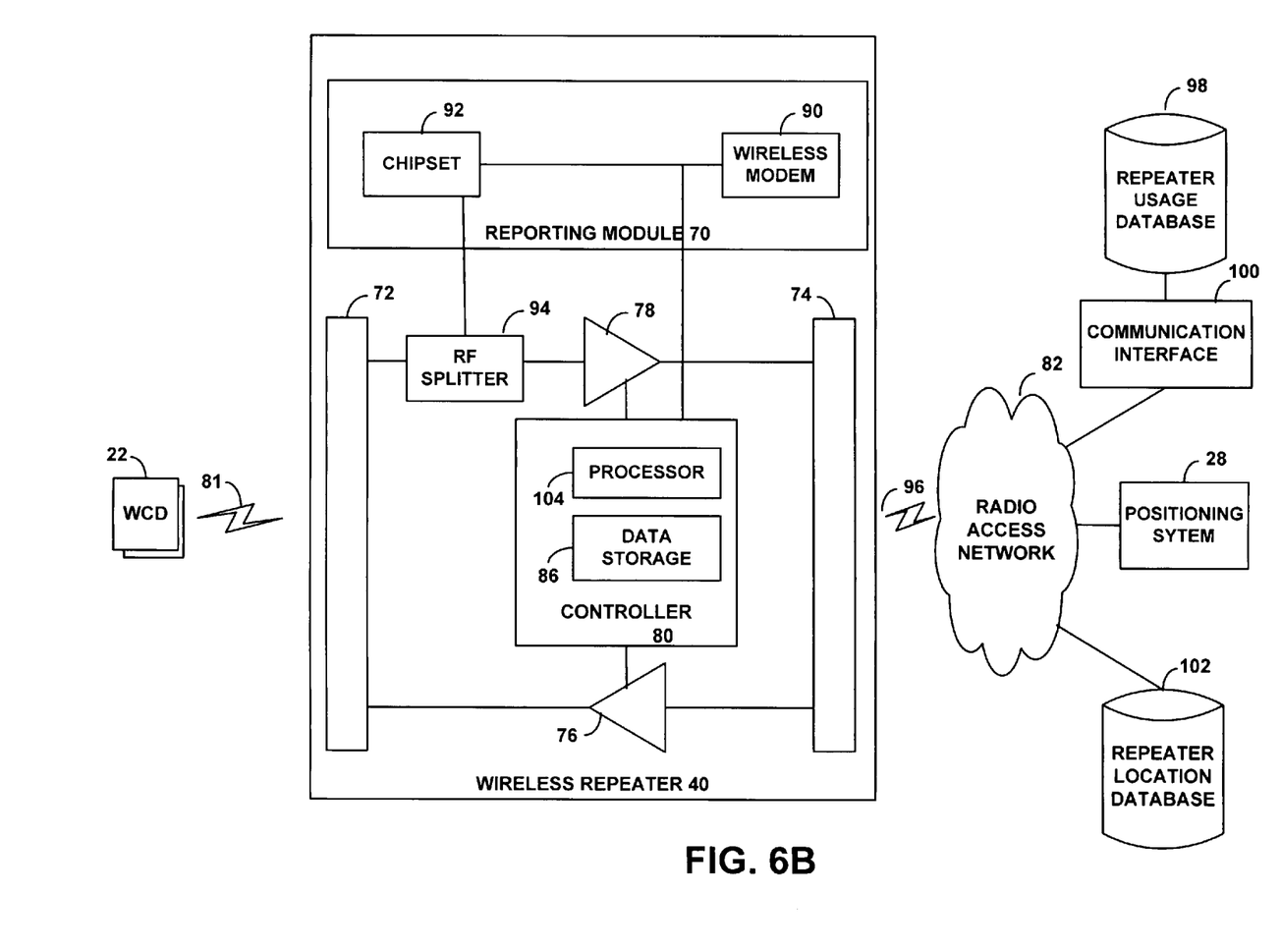
FIG. 6B is a functional block diagram illustrating components of a wireless communication system in which the exemplary embodiment of the system.

FIG. 6B is simplified block diagram of an alternative embodiment of the system that is capable of detecting, at a repeater, a predefined characteristic in a communication from a WCD, and responsively outputting a reporting signal. FIG. 6B is similar to FIG. 6A. However, in FIG. 6B, the reporting module 70 is internal, rather than external, to wireless repeater 40. Further, controller 80 includes processor 104, which can replace the functionality of both the processors 84, 88 shown in FIG. 6A. As such, controller 80 is communicatively coupled to chipset 92 and wireless modem 90. Note that a processor such as processor 104 can also be used when the reporting module is external to wireless repeater 40. As another alternative, processor 104 could be located in reporting module 70, both when reporting module 70 is internal and external to repeater 40. As yet another alternative, reporting module 70 could be located within wireless repeater 40, as shown in FIG. 6B, but could include a second processor 88, as shown in FIG. 6A. Other arrangements are possible as well.

An exemplary embodiment of the invention has been described above. Those skilled in the art will understand, however, that changes and modifications may be made to the embodiment described without departing from the true scope and spirit of the invention, which is defined by the claims.

The invention claimed is:

1. A method comprising:
    detecting, at a wireless repeater, that a communication passing between a wireless communication device and radio access network infrastructure via the wireless repeater has a predefined characteristic;
    responsively outputting a reporting signal,
    receiving the reporting signal;
    using the reporting signal as a basis for determining a location of the repeater; and
    using the location of the repeater as a basis for determining a location of the wireless communication device,
    wherein using the location of the repeater as a basis for determining the location of the wireless communication device comprises: (i) determining a delay between the wireless communication device and the repeater, and (ii) determining, based at least in part on the location of the repeater and the delay between the wireless communication device and the repeater, the location of the wireless communication device, and
    wherein determining the delay between the wireless communication device and the repeater comprises: (i) determining a delay between the repeater and a radio access network component associated with the repeater, (ii) determining a delay introduced by the repeater, (iii) determining a delay between the wireless communication device and the radio access network component associated with the repeater, and (iv) subtracting the delay between the repeater and the radio access network component associated with the repeater and the delay introduced by the repeater, from the delay between the wireless communication device and the radio access network component associated with the repeater.

2. The method of claim 1, wherein the communication comprises a call origination message.

3. The method of claim 2, wherein the predefined characteristic in the communication comprises predefined dialed digits.

4. The method of claim 1, wherein outputting a reporting signal comprises generating and transmitting a repeater-usage message.

5. The method of claim 4, wherein the repeater-usage message includes an identifier of the wireless communication device.

6. The method of claim 4, wherein the repeater-usage message includes an identifier of the repeater.

7. The method of claim 4, wherein transmitting the repeater-usage message comprises sending the repeater-usage message to the database.

8. The method of claim 1, wherein using the location of the repeater to determine the location of the wireless communication device comprises using the location of the repeater to perform triangulation.

9. The method of claim 1, wherein the communication has a first intended destination and the reporting signal has a second intended destination different from the first destination.

10. The method of claim 9, wherein the first intended destination is a base transceiver station (BTS), wherein the second intended destination is a database, wherein outputting the reporting signal comprises generating and transmitting a repeater-usage message, and wherein transmitting the repeater-usage message comprises sending the repeater-usage message to the database, the method further comprising sending the communication to the BTS.

11. A repeater comprising:
 a first transceiver configured to communicate with a wireless communication device;
 a second transceiver configured to communicate with radio access network infrastructure;
 amplification circuitry coupled between the first transceiver and second transceiver, the amplification circuitry being configured to amplify a communication passing between the wireless communication device and the radio access network infrastructure;
 a modem;
 one or more processors, including at least one processor coupled to the modem and programmed to detect a predefined characteristic in a communication passing between the wireless communication device and the radio access network infrastructure via the repeater and to responsively cause the modem to send a reporting signal, wherein the communication comprises a call origination message; and
 a chipset operable to receive the communication, and to demodulate the call origination message to obtain dialed digits associated with the call origination message.

12. The repeater of claim 11, further comprising a radio frequency splitter operable to receive the communication from the first transceiver and send the communication to the at least one processor and to the amplification circuitry.

13. The repeater of claim 11, wherein the processor is further operable to receive from the chipset the dialed digits associated with the call origination message, and wherein the predefined characteristic is predefined dialed digits.

14. The repeater of claim 11, wherein the processor is further operable to generate the reporting signal.

15. The repeater of claim 11, wherein the modem comprises a wireless modem and wherein the at least one processor causes the modem to send the reporting signal over an air interface.

16. The repeater of claim 15, wherein responsively outputting the reporting signal comprises transmitting the reporting signal to the repeater-usage database via the radio access network.

17. The repeater of claim 11, wherein the communication has a first intended destination, and wherein the reporting signal has a second intended destination different from the first destination.

18. The repeater of claim 17, wherein the first intended destination is a base transceiver station (BTS), and wherein the second intended destination is a repeater-usage database, and wherein outputting the reporting signal comprises transmitting the reporting signal to the repeater-usage database via the radio access network infrastructure, and wherein the second transceiver is further configured to send the communication to the BTS.

19. A repeater comprising:
 a first transceiver operable to communicate with a wireless communication device;
 a second transceiver operable to communicate with radio access network infrastructure;
 amplification circuitry, coupled between the first transceiver and second transceiver, for amplifying communications passing between a wireless communication device and the radio access network infrastructure;
 a modem;
 one or more processors, including at least one processor coupled to the modem and programmed to detect a predefined characteristic in a communication passing between the wireless communication device and the radio access network infrastructure via the repeater and to responsively cause the modem to send a reporting signal, wherein the communication comprises a call origination message; and
 a chipset operable to receive the communication and to demodulate the call origination message to obtain dialed digits associated with the call origination message.

* * * * *